United States Patent
Cheng et al.

(10) Patent No.: US 6,999,425 B2
(45) Date of Patent: Feb. 14, 2006

(54) DYNAMIC REVERSE LINK RATE LIMIT ALGORITHM FOR HIGH DATA RATE SYSTEM

(75) Inventors: Terry Si-Fong Cheng, Singapore (SG); Frances Jiang, Whippany, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 772 days.

(21) Appl. No.: 09/732,454

(22) Filed: Dec. 7, 2000

(65) Prior Publication Data

US 2002/0105974 A1    Aug. 8, 2002

(51) Int. Cl.
H04Q 7/00    (2006.01)
H04J 3/22    (2006.01)

(52) U.S. Cl. .................. 370/252; 370/278; 370/329
(58) Field of Classification Search ........ 370/229–235, 370/310, 328, 329, 331, 332, 335, 338, 341, 370/342, 441, 470, 252, 278; 455/453, 501, 455/226.3
See application file for complete search history.

(56) References Cited

U.S. PATENT DOCUMENTS

| | | | | |
|---|---|---|---|---|
| 5,856,971 A | | 1/1999 | Gitlin et al. ............ | 370/335 |
| 6,173,187 B1 * | | 1/2001 | Salonaho et al. ........ | 455/453 |
| 6,594,495 B1 * | | 7/2003 | Salonaho et al. ........ | 455/453 |
| 2002/0052206 A1 * | | 5/2002 | Longoni ................. | 455/453 |

FOREIGN PATENT DOCUMENTS

| | | |
|---|---|---|
| EP | 1 100 283 A1 | 5/2001 |
| WO | WO 98/24199 | 6/1998 |
| WO | WO 00/27146 | 5/2000 |

* cited by examiner

Primary Examiner—John Pezzlo
Assistant Examiner—Saba Tsegaye

(57) ABSTRACT

A method for determining the reverse link data Rate Limit for mobile stations active on the reverse link of a High Data Rate system is disclosed. In the ideal case, the Rate Limit is based on only the number of mobile stations located in a common sector that are actually active on the reverse link. Currently, the Rate Limit is determined from the total number of mobile stations in a common sector where the total includes mobiles that are transmitting and receiving. Thus, the current method includes mobile stations that are active on the forward link and may not be active on the reverse link. In this invention, a more optimum method of estimating the reverse link loading is obtained from calculations which includes only the mobile stations which are active on the reverse link. An estimate of the reverse link loading of the mobile stations in a common cell is obtained by adding together the data rates of the data sent from each mobile in a common sector during a common frame. This aggregate rate of data during the frame is filtered to minimize irregularities by using the moving average of an infinite impulse response filter and then normalized. The normalized result is a percentage of the maximum achievable aggregate reverse link rate. The final result is compared with a set of threshold values to obtain the maximum Rate Limit that is then set for each mobile station.

10 Claims, 2 Drawing Sheets

DYNAMIC REVERSE LINK RATE LIMIT ALGORITHM FOR HIGH DATA RATE SYSTEM

BACKGROUND OF THE INVENTION

1. Field of the Invention

This invention relates generally to mobile telephone systems and, more particularly, to a method of dynamically controlling the data rate limit on the reverse link of a high data rate transmission system.

2. Description of the Related Art

A communication system is normally required to support a variety of applications. One such communication system is a Code Division Multiple Access (CDMA) system which allows for voice and data communications between end users over a terrestrial link.

The CDMA system is designed to optimize voice communication and many system design parameters are selected to achieve this goal. For example, since time delay between speakers cannot be tolerated, processing delays should be minimized. Each end user is assigned a transmission rate capable of carrying speech data for the duration of a call.

In the CDMA system, end users communicate from mobile stations to base stations located in cells. A user at a mobile station located in a cell communicates with another at a second mobile station or with a standard telephone, by transmitting voice data on the reverse link to a base station. The base station receives the voice data on the reverse link and can route the data to another mobile station via a second base station or to a public switched telephone network. If the second user is at a mobile station, the voice data is transmitted on the forward link of the same base station or of a second base station, to a second mobile station. Otherwise, the voice data is routed through the public switched telephone network to the second user on the standard phone system. In a CDMA system, the forward link and the reverse link are allocated separate frequencies.

The CDMA system is a spread spectrum communication system where communications from a base station to a cell occur on the reverse link, each transmitting mobile station causes interference to other mobile stations in the network and this interference limits the capacity of the reverse link. The reverse link capacity can be increased by transmitting fewer bits which requires less power and reduces interference when the user is not speaking. To minimize interference and maximize the reverse link capacity, the transmit power of each remote station is controlled to maintain the signal that is received at the cell at a constant level and at a specific Quality of Service (QoS) level as determined by the frame error rate.

The user at each mobile station transmits at a different bit rate depending on the level of speech activity in the conversation of that user. A variable rate speech vocoder provides speech data at full rate when the user is actively speaking and at a low rate during period of silence. The amount of speech activity at any given instant is never constant. Therefor, the total power received at the cell from all transmitting mobile stations varies over time. During periods of active speech, the mobile station transmits at a higher power which causes more interference to other mobile stations which, in turn, increases the probability of frame errors in the voice data received by the cell. This further limits the number of users able to gain access to the communication system to minimize the number of transmitted frames that are lost through excessive interference.

Limiting the reverse link capacity to maintain the desired frame error rate and, therefore, the Quality of Service level has the effect of forcing a cell to operate at less than full capacity. As a result, the reverse link is often under utilized.

Data communication within the CDMA system has different characteristics than voice communication. Data communication is typically characterized by long periods of inactivity, or low activity, interrupted by high bursts of data traffic. An important system requirement for data transmission is the delay required to transfer a burst of data. Transmission delays do not have the same negative impact on data communication as it does for voice communication, but delays are important for measuring the Quality of Service level of the data communication system.

In a CDMA system, since voice communication cannot tolerate extensive delay, priority is given to the transmission of voice data over the transmission of data traffic. The amount of voice activity at any given instant is unpredictable and, therefore, in a CDMA system the transmission of data will be adjusted to prevent the reverse link capacity from being exceeded. In addition, since the mobile station may be in soft handoff between multiple cells, the data transmission rate assigned may be based on the reverse link capacity of each of the base stations involved in the soft handoff.

It is anticipated that the demand for higher transmission rates for data will increase for both the forward link and the reverse link because a typical mobile user is expected to receive and generate increased amounts of data. The forward link signal is the RF signal transmitted from a base station to one or more mobile stations. The reverse link signal is the RF signal transmitted from the mobile station to a base station. In anticipation of the need for a system to transmit data at higher rates, a High Data Rate (HDR) system is evolving.

In a High Data Rate system, the forward link traffic channel is used for the transmission of an end user's data from a base station to a particular mobile station. During normal operation, the base station generates multiple forward link traffic channels, each of which is used for communication with a particular mobile station. The reverse link traffic is used to monitor common channels while exchanging high data rate data, and performs separate registration, authentication and signaling/data exchange with the high data rate system. In the high data rate system, a Rate Limit message is transmitted to control the reverse link Rate Limit for each active mobile station. The Rate Limit sets the constraints for the mobile station medium access control layer protocol, e.g., slow increase of data rate, minimum data rate that can carry the number of bytes in the buffer, and Power Amplifier limits. Thus, the Rate Limit setting is used to tell the mobile what the allowable current maximum transmission rate is for the reverse link. The current algorithm for determining the data rate for the reverse link uses the number of active users in the sector to set the rate limit. When data is transmitted, the forward and reverse link transmission is asymmetric and, therefore, end users that are active on the forward link may not be transmitting data on the reverse link at the same time. Thus, the current method of determining the Rate Limit setting for mobiles on the reverse link does not consider the actual number of mobiles that are currently active only on the reverse link. Therefore, it is not possible with the present method to accurately determine what the rate limit for the mobiles should be to obtain the highest possible data rate that the reverse link can carry. A new method which more accurately determines the rate limit for the reverse link is needed, and this invention is directed towards doing that.

SUMMARY OF THE INVENTION

The present invention is a method for determining the reverse link data Rate Limit for mobile stations active on the reverse link of a High Data Rate system. In the ideal case, the Rate Limit is based on only the number of mobile stations located in a common sector that are actually active on the reverse link. Currently, the Rate Limit is determined from the total number of mobile stations in a common sector where the total includes mobiles that are transmitting and receiving. Thus, the current method includes mobile stations that are active on the forward link and may not be active on the reverse link. In this invention, a more optimum method of estimating the reverse link loading is obtained from calculations which includes only those mobile stations which are active on the reverse link. An estimate of the reverse link loading of the mobile stations in a common cell is obtained by adding together the data rates of the data sent from each mobile in a common sector during a common frame. This aggregate rate of data during the frame is filtered to minimize irregularities by using the moving average of an infinite impulse response filter and then normalized. The normalized result is a percentage of the maximum achievable aggregate reverse link rate. The final result is compared with a set of threshold values to obtain the maximum Rate Limit that is then set for each mobile station.

BRIEF DESCRIPTION OF THE DRAWINGS

A more complete understanding of the present invention can be obtained by referring to the following detailed description of the preferred embodiment that follows, taken in conjunction with the accompanying drawings, wherein.

DETAILED DESCRIPTION

A High Data Rate (HDR) system shares the same spectrum with an IS-95/IS-2000/3G-1X system by using a separate 1.25 MHz frequency dedicated to HDR. The HDR forward link uses a single shared channel which always transmits at full power (except for the power control bits). Users are time-multiplexed on the forward channel (instead of code division access) so as to achieve a higher data throughput for a single user. There is no softer/soft handoff on the forward link, since the mobile station only listens to one forward link at any given time. The transmission data rate on the forward link as well as which sector is the next desired transmitting forward link is determined by the mobile, by an algorithm which takes into account the RF conditions and other factors. Then the mobile indicates the desired rate and serving sector via the Reverse Data Rate Control Channel. The base station controls and selects which user's data is to be transmitted in the next forward link slot by a scheduling algorithm. Each slot is 1.667 ms and each frame is 26.67 ms. There are 16 slots in each frame. The forward link has four types of channels: The Pilot, Medium Access Control (MAC), Control Channel and Traffic. The MAC is further divided into Reverse Activity and Reverse Power Control channels. The Reverse Link still uses the CDMA scheme. The reverse link has the following types of channels: Access, which is further divided into the Pilot and Data, as well as the Traffic, which is further divided into the Pilot, MAC, ACK and Data. The MAC supports Reverse Rate Indicator (RRI) and Data Rate Control (DRC) channels. The reverse link is power controlled and has softer/soft handoff. When the mobile is assigned a reverse traffic channel, the mobile always transmits the Pilot Channel, the DRC channel and the ACK Channel. The reverse data is transmitted when needed at the rate indicated in the RRI channel. The mobile does not transmit on the reverse traffic channel when it is dormant because there is no traffic channel assigned in dormant.

Figure 1:
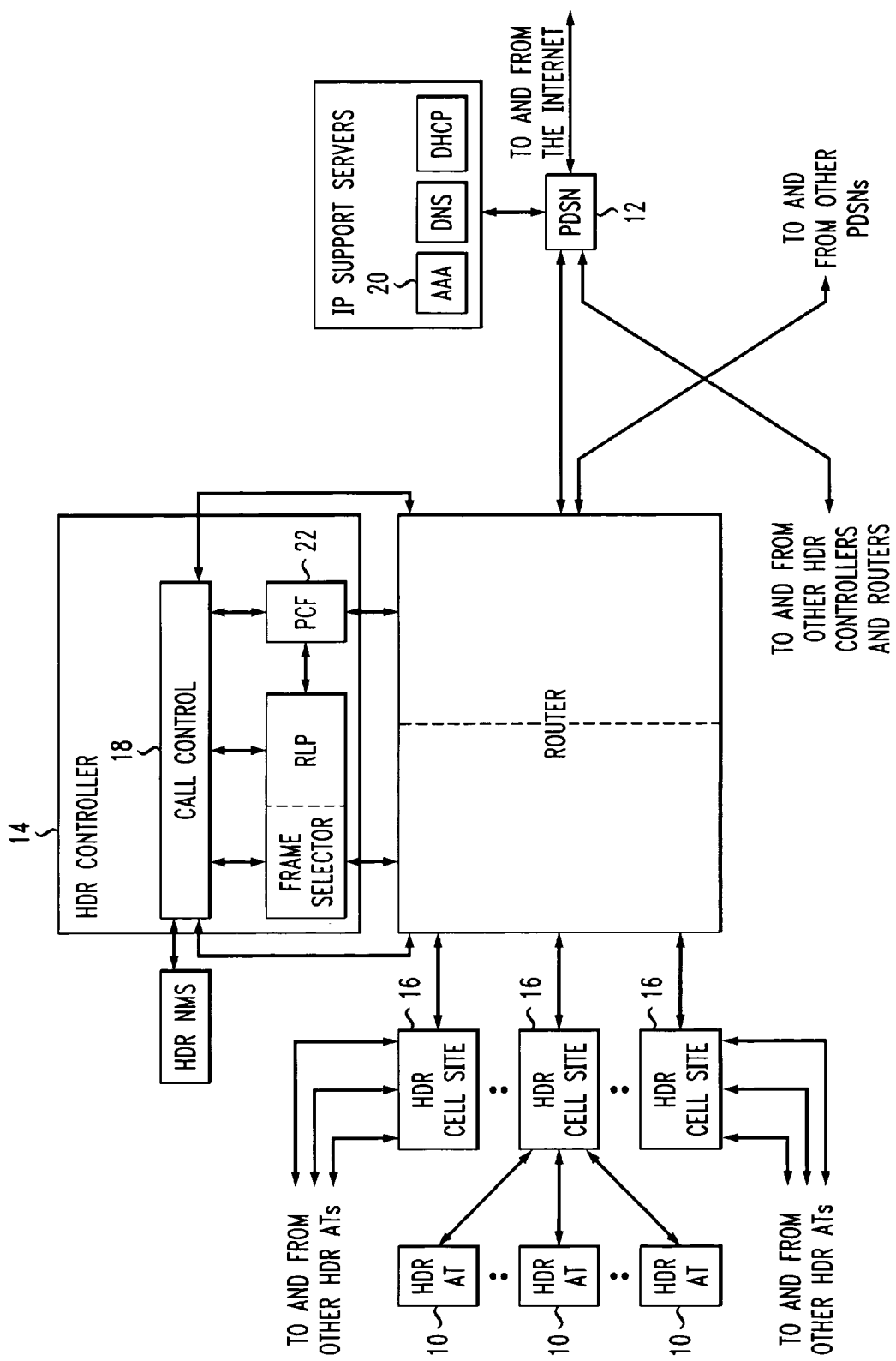
FIG. 1 illustrates a block diagram of a High Data Rate system.

FIG. 1 illustrates, in block form, a High Data Rate (HDR) system. The system can be made up of the following components: multiple HDR Access Terminals (AT) or mobile stations coupled to a plurality of HDR Cell Sites. A number of HDR Cell Sites are connected to an HDR Controller; one or more HDR Controller is connected to Packet Data Service Nodes (PDSN); and the PDSNs are connected to the rest of the Internet World. These interconnected components specify the behavior of the HDR Controller and how it works with the other components to create a total wireless system that supports a High Data Rate system which can transmit up to a peak rate of 2.4 Mbps on the forward link and 153.6 Kbps on the reverse link.

A mobile station (AT) 10 initiates a session with the PDSN 12 by connecting to the HDR Controller 14. The appropriate HDR cell site 16 processes an incoming connection request and, in turn, requests service from its HDR Controller 14. This initial phase of the call processing is done by the Call Controller 18. Once the Call Controller determines, by going through a number of steps, that the requested traffic connection should be established, it selects and allocates an appropriate process to make the connection. In addition, it instructs the HDR Cell Site carrier to establish the traffic channel and to connect it directly with the created process that will handle the connection. The PDSN is then selected from a list of PDSNs to establish a PCF to PDSN traffic interface connection.

Once the overall connection is established, the end user at the mobile can go through the Internet Protocol (IP) logic procedures with the PDSN, which typically involves authenticating the user through the Accounting, Authentication and Authorization (AAA) server 20. Once successfully authenticated, the end user and the PDSN create a Point to Point Protocol session between themselves. This Point to Point Protocol session normally remains until the end user terminates the session.

With the current HDR system, an end user can automatically select or control the rate at which data is transmitted on the reverse link. The HDR system uses a Rate Limit setting which determines the current maximum transmission rate that a mobile is allowed to transmit on the reverse link. Ideally, this Rate Limit is dependent on the loading of the reverse link, and the loading is a function of the number of mobiles that are actively sending data in the reverse link in the same sector. In an HDR system, the active mobiles can be divided into two general groups, those that are receiving data and those that are transmitting data. At the present time, the total number of mobiles that comprise the two groups, that is, the mobiles that are actively transmitting data and those that are receiving data in a common sector are used to determine the Rate Limit setting. In an HDR system, the forward and reverse link transmission is asymmetric. That is, active users on the forward link may not be transmitting data on the reverse link at the same time. Therefore, the current method of using the total number of active mobiles regardless of whether they are receiving or transmitting data to determine the Rate Limit for the reverse link can, at best, result in a Rate Limit setting that can be significantly less than optimal.

In this invention, in a High Data Rate system, a more accurate method of setting the Rate Limit for the reverse link is disclosed. An estimate of the reverse link load of a high data rate system is obtained by adding together the data rate transmitted from each active mobile in the sector during each frame. In this invention, an estimate of the load is obtained each 26.67 ms which is the duration time of a frame. The obtained estimated load is compared with a set of threshold values to obtain the Rate Limit setting. But, as it is not practical to change the Rate Limit at the end of each frame (every 26.67 ms), a window which comprises a plurality of consecutive frames is included in the algorithm to function as a filter for smoothing the Rate Limit values obtained. The number of frames in the window can vary from two frames up to and exceeding 1000 frames.

The algorithm for obtaining the Rate Limit for a mobile is $$\text{Load}(n) = \left(1 - \frac{1}{t}\right) * \text{Load}(n-1) + \left(\frac{1}{t}\right) * \frac{R_{AN}}{R_{MAX}}.$$

Where t is a window constant which consists of a predetermined number of frames, n is the frame number for which the load is being determined, $R_{AN}$ is the aggregate rate of the mobiles transmitting on the reverse link during frame n; and $R_{MAX}$ is the maximum rate that the reverse link can carry without being overloaded.

When the aggregate rate $R_{AN}$ is divided by the expected maximum reverse link aggregate rate $R_{MAX}$, the dimension of the "Load(n)" obtained is a percentage of the maximum achievable aggregate reverse link rate.

Figure 2:
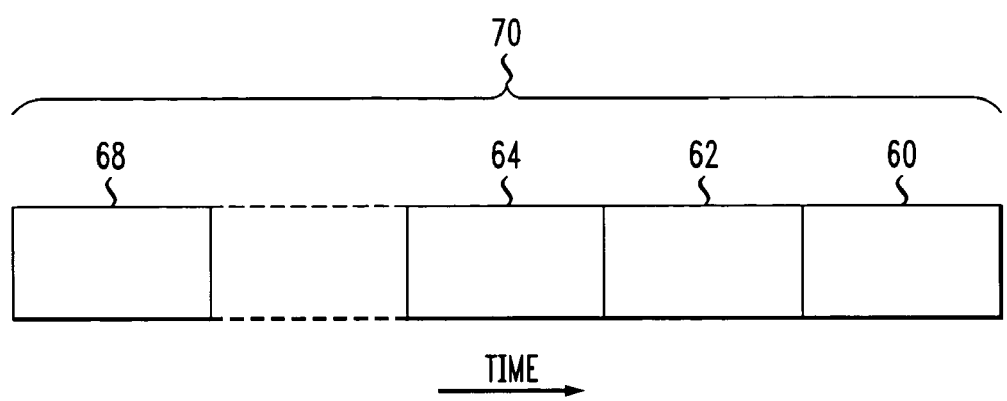
FIG. 2 illustrates a window having fifty frames.

The algorithm gives a reverse link load value that is a moving average of the reverse link load from a time frame that goes from the distant past up to the present. Each new calculation by the algorithm updates the most recently calculated reverse link load value by adding an increment load value to the previously obtained value and is dependent upon the number of frames in a window. The algorithm here disclosed does not ignore the previously calculated load value when computing the new load value. Actually, each new calculation by the algorithm builds on the previously calculated load value and modifies the previously obtained load value to include the most recently obtained load value. A window that includes a few frames will have less of an effect on the new load value than a window that has more frames. Abrupt changes in the value of the Rate Limit value which will occur if the window contains two frames can be avoided by including more frames, for example 20 or 50 frames, in the window. In the explanation of the operation of this invention, and for illustrative purposes only, the window is comprised of fifty frames N, N–1, . . . N–49 where frame N is the current frame and frames N–1, N–2 . . . N–49 are the forty-nine frames which immediately precede the current frame N. Referring to FIG. 2, frame 60 is the current frame, and frames 62, 64, . . . 68 are preceding frames where frames 60–68 comprise the fifty frames of window 70. Now, for illustrative purposes, utilization of the algorithm is as follows: assume that there are five mobiles transmitting on the reverse link where mobiles 1 through 5 are transmitting at 9.6 kbps; 153.6 kbps, 9.6 kbps, 9.6 kbps and 76.8 kbps, respectively.

The total of the bps of all of the mobiles transmitting during a frame, i.e., frame 60, is the aggregate data rate on the reverse link during frame 60 from all of the mobiles in a common sector.

Referring to the algorithm given above for obtaining the Rate Limit for a mobile, the reciprocal of the number of frames in the window is subtracted from number one to provide a first number. In the illustrative example, the window has 50 frames. Therefore, the first number is $$1 - \frac{1}{50} = .98.$$

The first number is multiplied by the load value obtained during the previous window consisting of the 49 frames which precede frame 60 to provide a second number. The reciprocal of the number of frames in the window $$\left(\frac{1}{50}\right)$$

is multiplied by the ratio of aggregate rate $R_{AN}$ of the mobiles transmitting on the reverse link during frame 60 divided by the expected maximum aggregate rate $R_{MAX}$ that the reverse link can support without being overloaded to give a third number. The second number is added to the third number to give a fourth number which is the maximum aggregate reverse link rate expressed as a percentage.

Thus, with the above illustrative numbers, the algorithm has the following $$\text{Load(at frame \#70)} = \left[1 - \frac{1}{50}\right].$$

$$\text{Load(at frame \#69)} + \frac{1}{50} \cdot \frac{R_{AN}}{R_{MAX}}.$$

Figure 3:
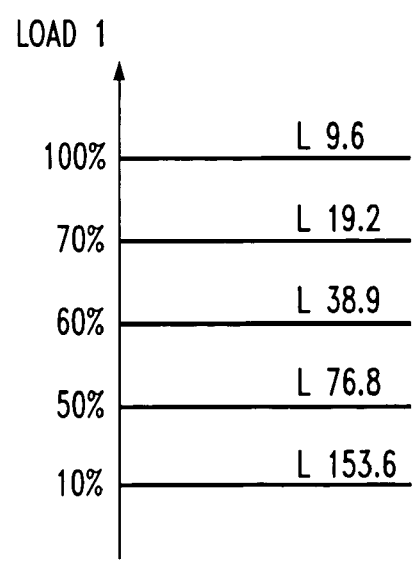
FIG. 3 illustrates threshold values for various normalized Rate Limits.

The fourth number, which is Load(50), is compared with a set of thresholds to determine the maximum Rate Limit that is to be set for each mobile. FIG. 3 illustrates the relationship between load in percent and load in bps. For loads of 10%, 50%, 60%, 70% and 100%, the threshold values are 153.6 kbps, 76.8 kbps, 38.9 kbps, 19.2 kbps and 9.6 kbps, respectively.

Referring to FIG. 3, let it be assumed that the load obtained from the algorithm in the specific example set forth above is 40%. This number is between Load No. 153.6 and Load No. 76.8. To avoid overloading the reverse link, the Rate Limit should be set to the next lower rate. Therefore, in our illustrative example, the Rate Limit for each of the five mobiles should be set at 76.8 kbps. Any of the five mobiles can be set to operate at a rate that is less than 76.8 kbps. But, the data rate limit for any of the mobiles should not be set to be higher than 76.8 kbps.

What is here disclosed is a method of estimating the optimum reverse link loading in a High Data Rate system. While a specific algorithm is disclosed, it is to be understood that this invention is not limited to a specific algorithm.

The previous description of the preferred embodiment is provided to enable any person skilled in the art to make or use the present invention. Various modifications to this embodiment will be readily apparent to those skilled in the art, and the generic principles defined herein may be applied to other embodiments without the use of the inventive faculty. Thus, the present invention is not intended to be limited to the embodiment shown herein but is to be accorded the widest scope consistent with the principles and novel features disclosed herein.

The invention claimed is:

1. A method of determining the reverse link data rate limit for a mobile station of a high data rate system comprising the steps of:
   providing a window of a number of frames;
   subtracting the reciprocal of the number of frames in the window from one to obtain a first number;
   multiplying the first number by a load value obtained during a previous window to obtain a second number;
   multiplying the reciprocal of the number of frames in the window by a normalized aggregate rate received during a single frame to obtain a third number; and
   adding the second number to the third number to obtain a fourth number which is a maximum aggregate reverse link rate expressed as a percentage.

2. The method of claim 1 further comprising the step of comparing the fourth number to a set of threshold values to obtain the maximum rate limit for the mobile station.

3. The method of claim 1 wherein the number of frames in the window is fixed.

4. The method of claim 3 wherein the frames in the window are consecutive frames.

5. The method of claim 3 where the fixed number of frames comprises at least two frames.

6. The method of claim 3 where the fixed number of frames in the window comprises up to five hundred or more frames.

7. The method of claim 1 wherein the normalized aggregate rate comprises a ratio of the aggregate of active mobiles divided by a maximum data rate limit of the reverse link.

8. The method of claim 1 where the aggregate rate is obtained by adding a data rate of each mobile in a common sector.

9. The method of claim 8 where a moving average of the aggregate rate is obtained by adding the aggregate rate for a single frame to an average rate of preceding frames.

10. The method of claim 9 where the rate of one of the preceding frames is dropped each time the rate of a new frame is added to a window.

* * * * *